(12) United States Patent
Micklos et al.

(10) Patent No.: US 12,458,151 B2
(45) Date of Patent: Nov. 4, 2025

(54) BODY SUPPORT STRUCTURES

(71) Applicant: Elements International Group, LLC, Mesquite, TX (US)

(72) Inventors: Josh Micklos, Montgomery, TX (US); Jeff Quinn, Mesquite, TX (US)

(73) Assignee: Elements International Group, LLC, Mesquite, TX (US)

( * ) Notice: Subject to any disclaimer, the term of this patent is extended or adjusted under 35 U.S.C. 154(b) by 216 days.

(21) Appl. No.: 17/500,792

(22) Filed: Oct. 13, 2021

(65) Prior Publication Data

US 2022/0110456 A1    Apr. 14, 2022

Related U.S. Application Data

(60) Provisional application No. 63/242,944, filed on Sep. 10, 2021, provisional application No. 63/213,135, filed on Jun. 21, 2021, provisional application No. 63/091,225, filed on Oct. 13, 2020.

(51) Int. Cl.
| | |
|---|---|
| *A47C 27/14* | (2006.01) |
| *A47C 27/08* | (2006.01) |
| *A47C 27/15* | (2006.01) |
| *A47C 27/16* | (2006.01) |
| *B68G 7/00* | (2006.01) |

(52) U.S. Cl.
CPC .......... *A47C 27/144* (2013.01); *A47C 27/085* (2013.01); *A47C 27/148* (2013.01); *A47C 27/15* (2013.01); *A47C 27/16* (2013.01); *B68G 7/00* (2013.01)

(58) Field of Classification Search
CPC ..... A37C 27/085; A37C 27/15; A37C 27/144; A37C 27/16; A37C 27/14; B68G 7/00; A61G 7/05723; A61G 7/05715
See application file for complete search history.

(56) References Cited

U.S. PATENT DOCUMENTS

| | | | | |
|---|---|---|---|---|
| 6,212,720 | B1 * | 4/2001 | Antinori | A47C 27/20 5/727 |
| 6,668,409 | B1 * | 12/2003 | Blumer | A47C 27/16 5/736 |
| 8,628,067 | B2 * | 1/2014 | Pearce | A47C 27/16 5/655.5 |
| 2008/0115286 | A1 * | 5/2008 | Flick | A47C 27/085 5/655.5 |
| 2012/0244312 | A1 * | 9/2012 | Pearce | D06N 7/0092 428/196 |
| 2013/0174344 | A1 * | 7/2013 | Klancnik | A47C 27/15 428/221 |
| 2019/0150629 | A1 * | 5/2019 | Pearce | A47C 27/16 |

FOREIGN PATENT DOCUMENTS

DE    202006018741 U1 *   6/2007   ........... A47C 27/144

* cited by examiner

*Primary Examiner* — Matthew Troutman
*Assistant Examiner* — Alison N Labarge
(74) *Attorney, Agent, or Firm* — Braxton Perrone, PLLC; Gregory Perrone; Bobby W. Braxton

(57) ABSTRACT

A body support structure comprising one or more gel layers, such as structures comprising a plurality of ridges and a plurality of valleys. Methods of forming the gel layers and body support structures comprising the gel layers. Systems for manufacturing body support structures comprising the gel layers.

20 Claims, 10 Drawing Sheets

BODY SUPPORT STRUCTURES

CROSS-REFERENCE TO RELATED APPLICATIONS

The present application claims the benefit under 35 U.S.C. § 119(e) of prior-filed provisional applications 63/091,225, filed Oct. 13, 2020; 63/213,135, filed Jun. 21, 2021, and 63/242,944, filed Sep. 10, 2021.

FIELD OF THE INVENTION

Generally, the present disclosure relates to body support structures, such as mattresses, mattress toppers, cushions, pillows, and the like.

DESCRIPTION OF THE RELATED ART

Foam body support structures, e.g., pillows, cushions, mattress toppers, and mattresses, such as viscoelastic or so-called "memory foam" mattresses, provide desirably high levels of firmness and support for many users. However, mattresses comprising only viscoelastic foam may lack sufficient support for some users. Also, mattresses comprising only one particular type of foam may lack desired levels of support for certain regions of a user's body.

The present disclosure may address and/or at least reduce one or more of the problems identified above.

SUMMARY OF THE INVENTION

The following presents a simplified summary of the disclosure in order to provide a basic understanding of some aspects of the disclosure. This summary is not an exhaustive overview of the disclosure. It is not intended to identify key or critical elements of the disclosure, or to delineate the scope of the disclosure. Its sole purpose is to present some concepts in a simplified form as a prelude to the more detailed description that is discussed later.

In one embodiment, the present disclosure is directed to a body support structure, comprising a support layer formed of a first material and comprising a plurality of ridges at or above a first height and a plurality of valleys at or below a second height below the first height.

In one embodiment, the present disclosure is directed to a method, comprising forming a support layer of a body support structure from a first material, wherein the support layer comprises a plurality of ridges at or above a first height and a plurality of valleys at or below a second height below the first height.

In one embodiment, the present disclosure is directed to a body support structure, comprising a plurality of gel springs, wherein each gel spring has a top surface, a bottom surface, and a side wall; and a first layer in contact with substantially the entire side wall of each gel spring.

In one embodiment, the present disclosure is directed to a body support structure, comprising a plurality of gel springs, wherein each gel spring has a top surface, a bottom surface, and a side wall; and a layer in contact with substantially the entire bottom surface of each gel spring, wherein the firmness of the body support structure depends at least in part on the resistance of the layer to compression applied to at least part of the top surface of at least one gel spring.

In one embodiment, the present disclosure is directed to a body support structure, comprising a plurality of gel springs, wherein each gel spring has a top surface, a bottom surface, and a side wall; a layer in contact with substantially the entire bottom surface of each gel spring; and a layer in contact with substantially the entire top surface of each gel spring; wherein at least one of the gel springs comprises a material which transfers heat away from a surface of the body support structure configured for contact with a user's body.

In one embodiment, the present disclosure is directed to a body support structure, comprising a plurality of gel springs, wherein each gel spring has a top surface, a bottom surface, and a side wall; a layer in contact with substantially the entire bottom surface of each gel spring; and a layer in contact with substantially the entire top surface of each gel spring; wherein at least one of the gel springs has a coiled structure.

In one embodiment, the present disclosure is directed to a body support structure, comprising a plurality of gel springs, wherein each gel spring has a top surface, a bottom surface, and a side wall; a layer in contact with substantially the entire bottom surface of each gel spring; and a layer in contact with substantially the entire top surface of each gel spring; wherein at least one of the gel springs has a structure comprising an inner gel and an outer skin, wherein the outer skin forms substantially the entire side wall of the gel spring.

In one embodiment, the present disclosure is directed to a body support structure, comprising a support layer formed of a first material and comprising a plurality of grooves at or above a first height and a plurality of plateaus at or below a second height above the first height.

In one embodiment, the present disclosure is directed to a method, comprising forming a support layer of a body support structure from a first material, wherein the support layer comprises a plurality of grooves at or above a first height and a plurality of plateaus at or below a second height above the first height.

The present disclosure may provide for body support structures, e.g., pillows, cushions, mattress toppers, and mattresses, with improved comfort for users reclining thereon.

BRIEF DESCRIPTION OF THE DRAWINGS

The disclosure may be understood by reference to the following description taken in conjunction with the accompanying drawings, in which like reference numerals identify like elements, and in which.

Figure 1:
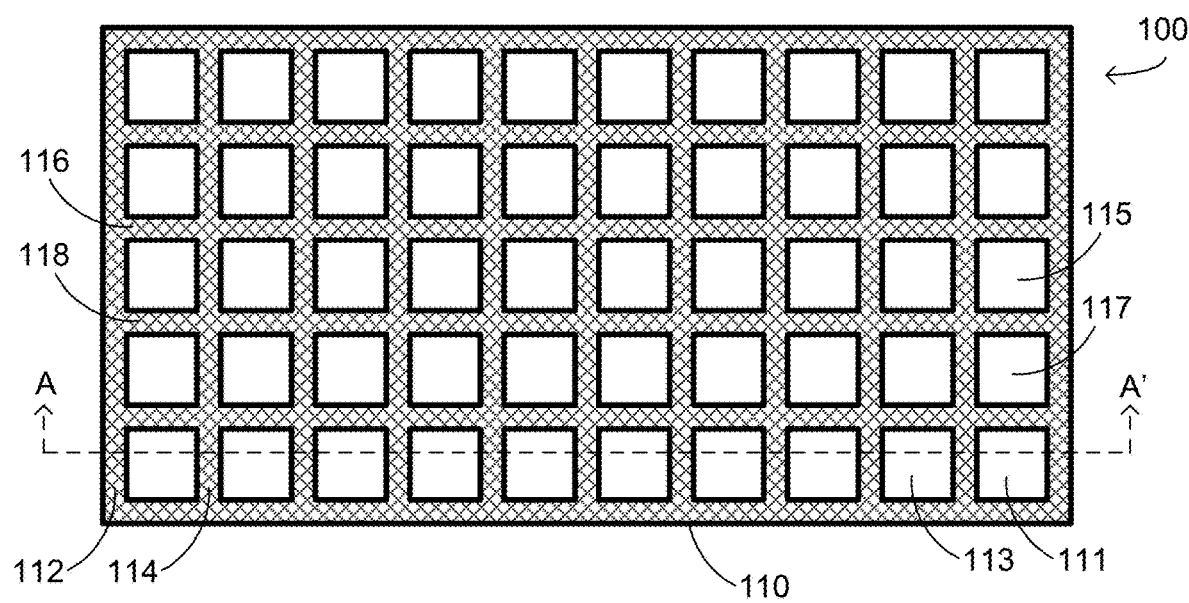
FIG. 1 illustrates a stylized top view of a first mattress, in accordance with embodiments herein.

For the avoidance of doubt, and in accordance with practice before the United States Patent and Trademark Office, none of the present figures are to scale.

While the subject matter disclosed herein is susceptible to various modifications and alternative forms, specific embodiments thereof have been shown by way of example in the drawings and are herein described in detail. It should be understood; however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

INCORPORATION BY REFERENCE

The following United States patents and published applications are hereby incorporated herein by reference.

U.S. Pat. Nos. 10,721,992; 9,775,403; 9,717,304; 9,320,317; 8,434,748; 7,138,079; 7,076,822; 6,865,759; 6,413,458; 6,026,527; 5,994,450; 5,881,409; 5,749,111; 5,626,657; 5,549,743; 5,421,874; 2018/0295941; 2018/0295934; 2015/0230549; 2014/0259748; 2014/0259743.

DETAILED DESCRIPTION

Various illustrative embodiments of the disclosure are described below. In the interest of clarity, not all features of an actual implementation are described in this specification. It will, of course, be appreciated that, in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would be a routine undertaking for those of ordinary skill in the art having the benefit of this disclosure.

The present subject matter will now be described with reference to the attached figures. Various structures, systems and devices are schematically depicted in the drawings for purposes of explanation only and to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments herein are directed to body support structures comprising one or more structures configured to enhance comfort of a user of the body support structure. Body support structures herein may include, but are not limited to, mattresses, mattress toppers, pillows, cushions, sofas, etc.

Turning to FIG. 1, a stylized, nearsighted top view of a gel layer 110 of a body support structure 100, in accordance with embodiments herein, is illustrated. By "nearsighted" is meant that the view is of a single plane of a three-dimensional object, with components of the object behind the plane being omitted for the sake of readability of the view.

Figure 17A:
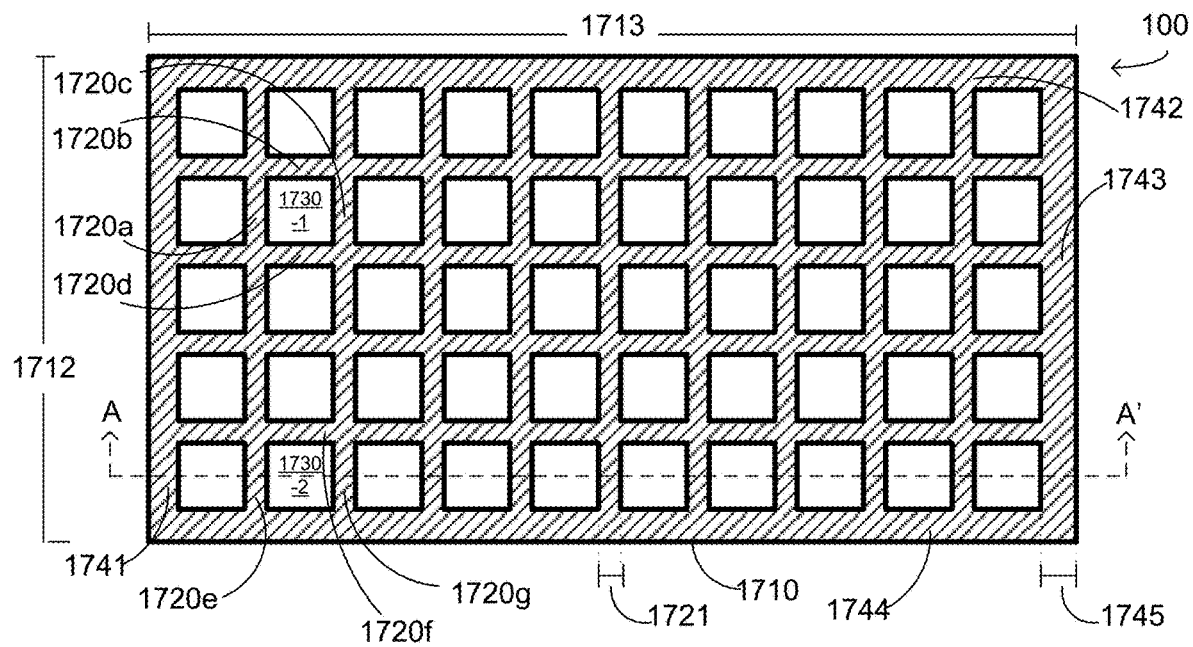
FIG. 17A illustrates a stylized top view of a gel layer, in accordance with embodiments herein.

The body support structure 100 has a generally rectangular profile in top view, i.e., the gel layer 110 and the body support structure 100 are each substantially a rectangular prism. FIG. 17A shows a stylized top view of a gel layer 1710 of a particular set of embodiments of the present disclosure. The gel layer 110 and the gel layer 1710 have numerous elements in common, and will be discussed together. Generally, any discussion regarding one gel layer 110 or 1710 will be applicable to the other gel layer 110 or 1710.

The gel layer 110 is formed of a first gel material. "Gel" is a term well-known in the art. More information regarding gel formulations and manufacturing techniques can be found in patents and other literature incorporated herein by reference.

In one embodiment, the gel layer 110 may comprise the following components by weight: Styrene block copolymer 2-80%, plasticized oil 10-90%, thermoplastic polystyrene-polybutadiene-polystyrene block copolymer 5-80%, toner 0.03-3%.

In a further embodiment, the gel layer 110 may comprise an essential oil additive from 0.01%-5% by weight. In one embodiment, the essential oil component of the essential oil additive is selected from the group consisting of green tea oil, sweet orange oil, menthol oil, peppermint oil, cedarwood oil, lemon oil, eucalyptus oil, aromatic litsea/mountain pepper oil, clove oil, spearmint oil, rose oil, lemongrass oil, lavender oil, thyme oil, alfalfa oil, allspice oil, ambrette (seed) oil, angelica root oil, angelica seed oil, angelica stem oil, angostura (cusparia bark) oil, anise oil, asafetida-foetida oil, balm (lemon balm) oil, balsam of peru oil, basil oil, bay leaves oil, bay (myrcia oil) oil, bergamot (bergamot orange) oil, bitter almond oil, bois de rose oil, cacao oil, camomile (chamomile) flowers oil, cananga oil, capsicum oil, caraway oil, cardamom seed (cardamon) oil, carob bean oil, carrot oil, cascarilla bark oil, cassia bark oil, chinese oil, cassia bark oil, padang or batavia oil, cassia bark oil, celery seed oil, cherry oil, wild oil, bark oil, chervil oil, chicory oil, cinnamon bark oil, ceylon oil, chinese oil, saigon oil, cinnamon leaf oil, citronella oil, citrus peels oil, clary (clary sage) oil, clover oil, coca (decocainized) oil, coffee oil, cola nut oil, coriander oil, cumin (cummin) oil, curacao orange peel (orange oil, bit oil, cusparia bark oil, dandelion oil, dandelion root oil, dog grass (quackgrass oil, triticum) oil, elder flowers oil, estragole (esdragol oil, esdragon oil, t oil, estragon (tarragon) oil, fennel oil, sweet oil, fenugreek-gr oil, galanga (galangal) oil, geranium oil, geranium oil, east indian oil, geranium oil, rose oil, ginger oil, grapefruit oil, guava oil, hickory bark oil, horehound (hoarhound) oil, hops oil, horsemint oil, hyssop oil, immortelle oil, jasmine oil, juniper (berries) oil, kola nut oil, laurel berries oil, laurel leaves oil, lavender oil, lavender oil, spike oil, lavandin oil, lemon (l.) burm. oil, lemon balm oil, lemongrass oil, lemon peel (l.) oil, lime oil, linden flowers oil, locust bean oil, oil, lupulin oil, mace oil, mandarin oil, marjoram oil, sweet oil, yerba mate oil, melissa (see balm) oil, menthol oil, menthyl acetate oil, molasses (extract) oil, mustard oil, naringin oil, neroli oil, bigarade oil, nutmeg oil, onion oil, orange oil, bitter oil, flowers oil, orange oil, bitter oil, peel oil, orange leaf (l.) oil, orange oil, sweet oil, orange oil, sweet oil, flowers oil, orange oil, sweet oil, peel oil, origanum oil, palmarosa oil, paprika oil, parsley (mi oil, pepper oil, black oil, pepper oil, white oil, peppermint oil, peruvian balsam oil, petitgrain oil, petitgrain lemon oil, petitgrain mandarin or tangerine oil, pimenta oil, pimenta leaf oil, pipsissewa leaves oil, pomegranate oil, prickly ash bark oil, rose absolute oil, rose (otto of roses oil, attar of roses) oil, rose buds oil, rose flowers oil, rose fruit (hips) oil, rose geranium oil, rose leaves oil, rosemary oil, saffron oil, sage oil, sage oil, greek oil, sage oil, spanish oil, st. john's bread oil, savory oil, summer oil, savory oil, winter oil, schinus molle oil, sloe berries (blackthorn berries) oil, spearmint oil, spike lavender oil, tamarind oil, tangerine oil, tarragon oil, tea oil, thyme oil, thyme oil, white oil, thyme oil, wild or creeping oil, tuberose oil, turmeric oil, vanilla oil, violet flowers oil, violet leaves oil, violet leaves absolute oil, wild cherry bark oil, ylang-ylang oil, and zedoary bark oil.

In one embodiment, the essential oil is green tea oil, which may be present at 0.3 wt %. The gel layer 110 comprises a plurality of ridges, such as specifically identified ridges 112, 114, 116, 118. The plurality of ridges 112-118 have a first height. The gel layer 110 also comprises a plurality of valleys, such as specifically identified valleys 111, 113, 115, 117. The plurality of valleys 111-117 have a second height below the first height.

The gel layer 110 may be considered to resemble a waffle, though this resemblance must not be construed as limiting the gel layer 110.

In the depicted embodiment of FIG. 1, the gel layer 110 comprises square valleys 111-117. However, the shape of the valleys 111-117 may vary. In other embodiments, not shown but immediately apparent to the person of ordinary skill in the art having the benefit of the present disclosure, the valleys 111-117 may have shapes selected from the group consisting of squares, rectangles, diamonds, parallelograms, other quadrilaterals, polygons with other than four sides, circles, ellipses, and other curved shapes.

FIG. 1 shows all ridges 112-118 and all valleys 111-117 as being uniformly sized, spaced, and shaped. In other embodiments, not shown for brevity, one or more ridges 112-118 etc. and/or one or more valleys 111-117 etc. may differ from other ridges/valleys in one or more of size, shape, and/or spacing.

Figure 2:
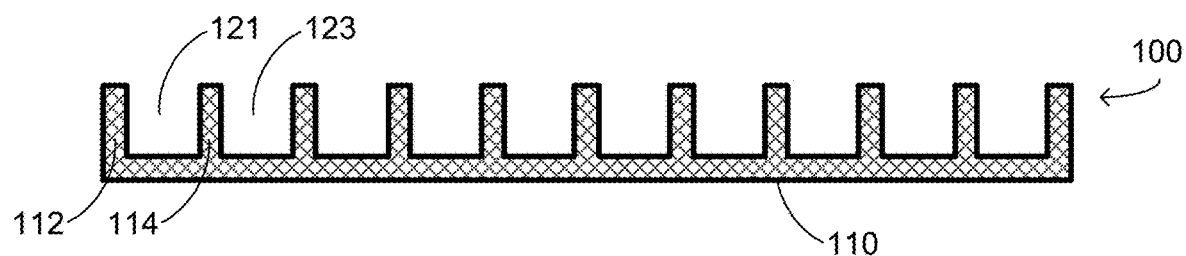
FIG. 2 illustrates a stylized cross-sectional view of the first mattress of FIG. 1 taken along the A-A' line in FIG. 1, in accordance with embodiments herein.

The first and second heights referred to above may be readily seen in FIG. 2, which is a cross-sectional view of the gel layer 110 taken along the A-A' line in FIG. 1. The tops of ridges 112, 114 are clearly above the bottoms of the valleys 121, 123. In the embodiment of FIG. 2, the valleys 121, 123, etc. are not filled. In another embodiment, shown in FIG. 3, at least one of the valleys (e.g., as depicted, all the valleys) are filled with a second material to yield filled valley(s) 213, 233, etc. The second material may be a polymeric material, such as polyurethane; a viscoelastic material; a non-viscoelastic material; an elastomeric material; a gel; any material disclosed by any document incorporated herein by reference; or the like.

Figure 3:
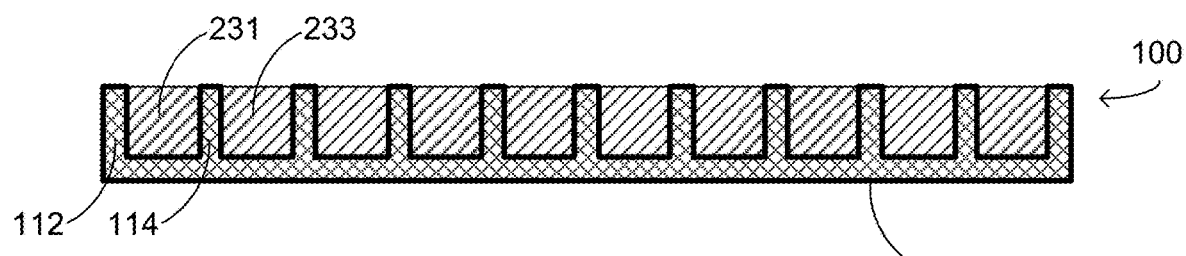
FIG. 3 illustrates a stylized cross-sectional view of the first mattress of FIG. 1 taken along the A-A' line in FIG. 1, in accordance with embodiments herein.

FIGS. 2-3 show all ridges 112-114 etc., all valleys 121-123 etc., and all filled valleys 231-233 etc. as having uniform heights. In other embodiments, not shown for brevity, one or more ridges 112-114 etc., one or more valleys 121-123 etc., and/or one or more filled valleys 231-233 etc. may differ from other ridges/valleys/filled valleys in height. Also, FIG. 3 shows all filled valleys 231-233 etc. as being completely filled with the second material. In one embodiment, not shown, one or more of the filled valleys 231-233 etc. may incompletely fill the corresponding valley 121-123 etc., by one or more of having a height below the tops of the adjacent ridges and/or having a width less than the width of the valley. Alternatively or in addition, one or more of the filled valleys 231-233 etc. may have a height above the tops of the adjacent ridges (not shown). In a further embodiment, not shown, two or more consecutive filled valleys 231-233 may be joined by second material above the top of the intervening ridge.

Figure 17B:
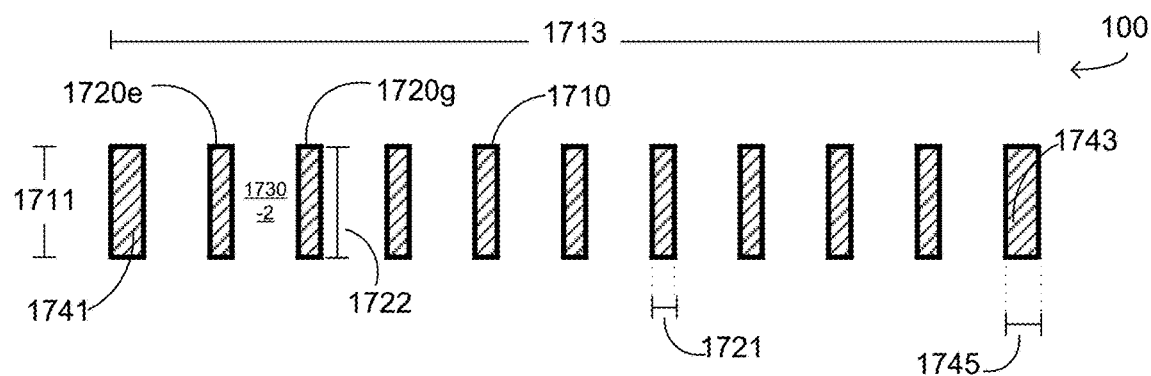
FIG. 17B illustrates a stylized nearsighted side cross-sectional view of the gel layer of FIG. 1A along line A-A', in accordance with embodiments herein.

FIG. 17B illustrates a stylized nearsighted side cross-sectional view of the gel layer 1710 of FIG. 17A along line A-A'. The gel layer 1710 having a rectangular prism shape having a support layer height 1711, a support layer width 1712, and a support layer length 1713. The "width" and the "length" may be arbitrarily selected, each from an opposed pair of sides of the rectangular prism. Typically, and particularly for embodiments wherein the gel layer 1700 is intended to top at least about half of a body support article, the width and height may be selected such that the support layer width 1712 is less than the support layer length 1713.

Regardless how the width and height are assigned, the support layer height 1711 is no more than one-third of the shorter of the support layer width 1712 and the support layer length 1713. In other words, the gel layer 1710 is much shorter than it is long and wide.

In embodiments, the support layer height may be from about 0.25" (0.64 cm) to about 1" (2.54 cm). In a particular embodiment, the support layer height may be about 0.5" (1.27 cm).

The gel layer 1710 comprises a plurality of first gel segments, collectively and/or generically 1720, with individual first gel segments 1720a, 1720b, 1720c, 1720d, 1720e, 1720f, and 1720g specifically identified in FIG. 17A and FIG. 17B. The definition of "segments" is arbitrary, in that the gel layer 1710 is essentially integral. Generally, each first gel segment 1720 has a first segment height 1722 essentially equal to the support layer height 1711, and a first segment thickness 1721 less than the first segment height 1722.

The first gel segments 1720 define a plurality of first gaps, collectively and/or generically 1730, with individual first gaps 1730-1 and 1730-2 specifically identified in FIG. 17A and FIG. 17B. In FIG. 17A and FIG. 17B, the first gap 1730-1 is defined by first gel segments 1720a, 1720b, 1720c, and 1720d. The first gap 1730-2 is defined by first gel segments 1720e, 1720f, and 1720g, along with a perimeter segment 1744 to be described later.

Generally, a "gap" 1730 in FIG. 17A and FIG. 17B is substantially the same as a "valley" 111, 113, 115, 117 in FIG. 1-FIG. 3. The two terms "gap" and "valley" may be used interchangeably herein.

Accordingly, a "segment" may be considered as a portion of the gel layer 1710 that separates any two adjacent first gaps 1730. Each first gap 1730 has a first size and a first shape. The shape is defined herein by reference to two-dimensional figures as seen from a top view. For example, the first gaps 1730 depicted in FIG. 17A, e.g., first gaps 1730-1 and 1730-2 each have a square shape. The size of the first gaps 1730 may also be varied, with "size" here referring to the lengths of the gel segments 1720 defining each first gap 1730 and the surface area of the shape.

The square shape of the first gaps 1730 in FIG. 17A is merely exemplary. Any one or more of a wide range of shapes may be considered. In one embodiment, the first gaps 1730 may each have a first size and a first shape selected from the group consisting of squares, rectangles, diamonds, parallelograms, other quadrilaterals, triangles, polygons with other than four sides, circles, ellipses, raindrops, and other curved shapes.

Figure 18A:
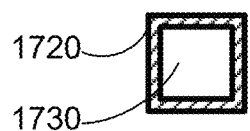
FIG. 18A illustrates a stylized top plan view of a first gel space, in accordance with embodiments herein.
Figure 18B:
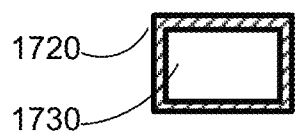
FIG. 18B illustrates a stylized top plan view of a second gel space, in accordance with embodiments herein.
Figure 18C:
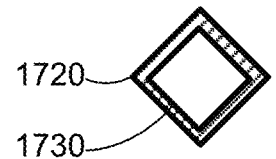
FIG. 18C illustrates a stylized top plan view of a third gel space, in accordance with embodiments herein.
Figure 18D:
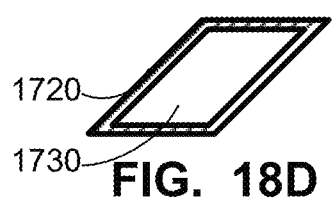
FIG. 18D illustrates a stylized top plan view of a fourth gel space, in accordance with embodiments herein.
Figure 18E:
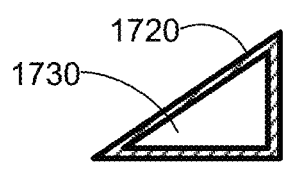
FIG. 18E illustrates a stylized top plan view of a fifth gel space, in accordance with embodiments herein.
Figure 18F:
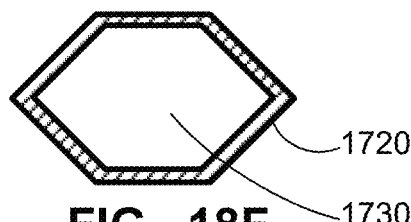
FIG. 18F illustrates a stylized top plan view of a sixth gel space, in accordance with embodiments herein.
Figure 18G:
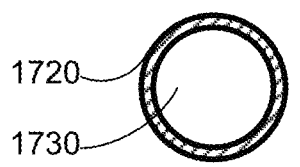
FIG. 18G illustrates a stylized top plan view of a seventh gel space, in accordance with embodiments herein.
Figure 18H:
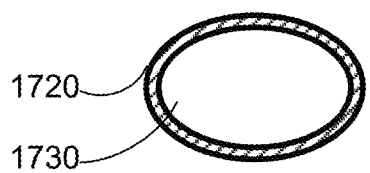
FIG. 18H illustrates a stylized top plan view of an eighth gel space, in accordance with embodiments herein.
Figure 18I:
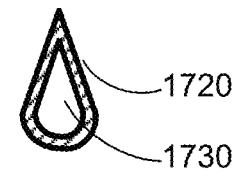
FIG. 18I illustrates a stylized top plan view of a ninth gel space, in accordance with embodiments herein.

FIG. 18A-FIG. 18K show particular top views of individual first gaps 1730 that may be used in the gel layer 1700 or 200. In one embodiment, each first gap 1730 has a shape in top view selected from the group consisting of squares, rectangles, diamonds, parallelograms, other quadrilaterals, triangles, polygons with other than four sides, circles, ellipses, raindrops, and other curved shapes. For example, in FIG. 18A, the first gap 1730 has a square shape in top view, with the understanding the square is oriented such that all of the gel segments 1720 are parallel to a side of the gel lattice. In FIG. 18B, the first gap 1730 has a rectangular shape in top view. In FIG. 18C, the first gap 1730 has a square shape in top view, with the understanding the square is oriented such that none of the gel segments 1720 are parallel to any side of the gel lattice. In FIG. 18D, the first gap 1730 has a parallelogram shape in top view. In FIG. 18E, the first gap 1730 has a triangular shape in top view. In FIG. 18F, the first gap 1730 has a hexagonal shape in top view. In FIG. 18G, the first gap 1730 has a circular shape in top view. In FIG. 18H, the first gap 1730 has an elliptical shape in top view. In FIG. 18I, the first gap 1730 has a raindrop shape in top view.

Figure 18J:
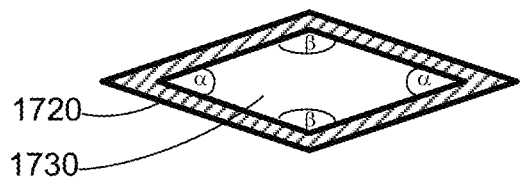
FIG. 18J illustrates a stylized top plan view of a tenth gel space, in accordance with embodiments herein.

In FIG. 18J, the gap 1730 has a diamond shape in top view. By "diamond" herein is meant a quadrilateral defined by four gel segments 1720, wherein each of the gel segments 1720 has the same length. The four gel segments 1720 define four corners, each with an interior vertex angle $\alpha$ or $\beta$, with vertex angles $\alpha$ being at a first pair of opposed corners and vertex angles $\beta$ being at a second pair of opposed corners. Generally, $\alpha$ is less than 90° and $\beta$ is more than 90°, with the proviso that $\alpha+\beta=180°$. In one embodiment, $\alpha$ is from 45° to 85° and $\beta$ is from 95° to 135°.

Though not to be bound by theory, we have observed that a gel layer 1710 comprising diamond-shaped first gaps 1730 tends to be plush, i.e., is relatively not firm. It also tends to have greater strength at the joints between first gel segments 1720 than square-shaped gaps, i.e., first gel segments 1720 are less likely to tear or otherwise suffer damage at joints when the first gaps 1730 are diamond-shaped.

Figure 18K:
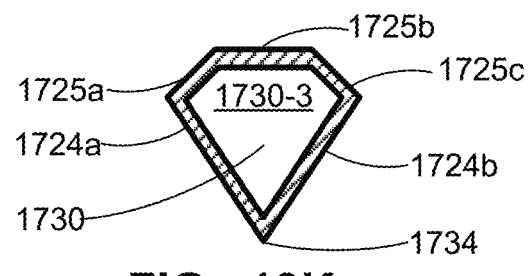
FIG. 18K illustrates a stylized top plan view of an eleventh gel space, in accordance with embodiments herein.

In FIG. 18K, the gap 1730-3 has a convex pentagon shape that is neither equilateral nor equiangular. In the specific embodiment shown in FIG. 18K, the convex pentagon shape is defined by two consecutive first gel segments 1724a, 1724b, each having a length equal to a first length, and three consecutive first gel segments 1725a, 1725b, and 1725c, each having a length equal to a second length less than the first length.

Figure 18L:
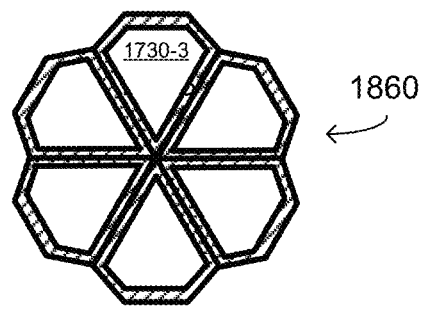
FIG. 18L illustrates a stylized top plan view of a rosette comprising six instances of the eleventh gel space of FIG. 18K, in accordance with embodiments herein.

One property of interest of the convex pentagon shape that is neither equilateral nor equiangular is shown in FIG. 18L. In FIG. 18L, six of the convex pentagon shapes 1730-3 form a rosette 1860 with 6-fold rotational symmetry around a vertex of the two consecutive first gel segments having the first length. The precise values of the first length and the second length may be selected such that the rosette 360 may tile the gel layer 1710.

Though not to be bound by theory, we have observed that a gel layer 1710 comprising first gaps 1730 with a convex pentagon shape that is neither equilateral nor equiangular, with the first gaps 1730 arranged in rosettes 1860 tiling the gel layer 1710, are relatively firm while providing improved pressure relief relative to first gaps 1730 with hexagonal shapes.

Accordingly, in one embodiment of the gel layer 1710, all the first gaps 1730 have an identical shape selected from diamonds and convex pentagons that is neither equilateral nor equiangular.

Although FIG. 17A and FIG. 17B depict all first gaps 1730 as having the same square shape, in other embodiments, the plurality of first gaps 1730 may comprise gaps 1730 of two or more shapes. Generally, one, two, or more shapes may be chosen to give the gel layer 1710 a tiled appearance (i.e., the gaps 1730 substantially fill a top view such as FIG. 17A without overlaps or omitted spaces).

FIG. 2 shows each valley 111, 113, 115, 117, 121, 123, etc. of the gel layer 110 as having a closed floor, e.g., the gel layer 110 is continuous under valley 121 between segments 112 and 114. FIG. 17B shows each gap/valley 1720 of the gel layer 1710 as having an open floor, e.g., the gel layer 1710 is discontinuous under gap 1730-2 between segments 1720e and 1720g. In any embodiment, the floor under none, one, some, or all gaps/valleys may be open and the floor under none, one, some, or all other gaps/valleys may be closed.

Typically, the one, two, or more shapes may form a single tiling pattern, such as is shown in FIG. 17A, but in other embodiments, not shown, the shapes may be varied at different regions of the top surface of the gel layer 1710.

The person of ordinary skill in the art will bear in mind that referring to the shapes of the first gaps 1730 with geometric terms represents an idealization. In practice, the first gaps 1730 may essentially or substantially have a given shape, bearing in mind routine processing variations, minimal processing defects, and other factors that will be apparent to the person of ordinary skill in the art having the benefit of the present disclosure.

The gel layer 1710 has a first firmness in a direction parallel to the support layer height, i.e., substantially in the line of sight of the reader looking at FIG. 17A. Though not to be bound by theory, the value of the first firmness may vary depending on one or more of the formulation of the gel in the gel layer 1710, the height 1711 of the support layer, the thickness 1721 of the first gel segments 1720, and the shape of the first gaps 1730, among other structural properties that will be apparent to the person of ordinary skill in the art having the benefit of the present disclosure.

The first firmness does not necessarily have the same value at all points on the top surface of the gel layer 1710. Variation in shape and size of first gaps 1730 in one or more regions of the gel layer 1710 may be chosen to provide regions of the gel layer 1710 having slightly greater or slightly lesser firmness than other regions. When we use the term "a firmness" of the gel layer 1710 or another structure, we refer to a surface-area weighted average of the precise firmness of all regions of the structure.

The gel layer 1700 shown in FIG. 17A and FIG. 17B further comprises four first perimeter segments 1741, 1742, 1743, and 1744. Each first perimeter segment 1741-1744 has a first perimeter segment height essentially equal to the support layer height 1711, and a first perimeter segment thickness 1745 equal to or greater than the first gel segment thickness 1721. As can most readily be seen in FIG. 17A, each first perimeter segment 1741-1744 is essentially coincident with one and only side of the gel layer 1710 perpendicular to the direction parallel to the support layer height.

Though not to be bound by theory, perimeter segments 1741-1744 may increase edge strength of the gel layer 1710, thereby reducing buckling of the gel layer 1710 around the perimeter and maintaining a desired level of firmness.

Figure 4:
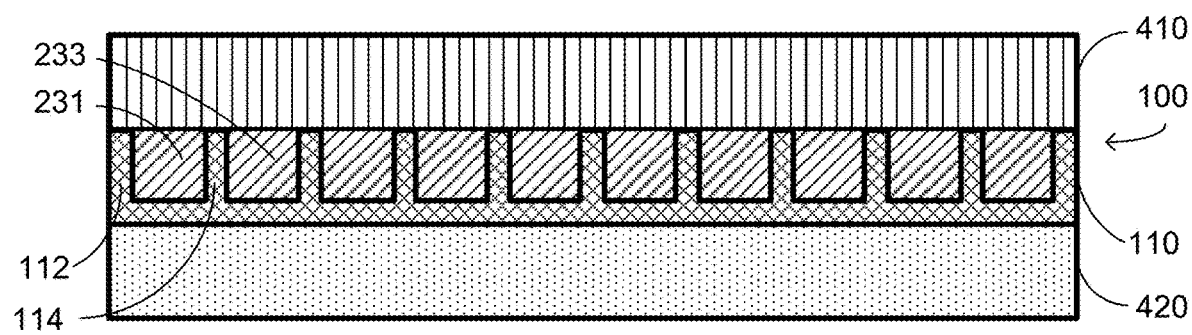
FIG. 4 illustrates a stylized cross-sectional view of the first mattress of FIG. 1 taken along the A-A' line in FIG. 1, in accordance with embodiments herein.

The gel layer 110 (or 1710) may be the only layer of a body support structure 100. In other embodiments, the body support structure 100 may further comprise at least one layer above the gel layer 110, at least one layer below the gel layer 110, or both. FIG. 4 depicts an embodiment wherein the body support structure 100 comprises a layer 410 above the first gel layer 110, and a layer 420 below the gel layer 110.

Any layer(s) above or below the gel layer 110, such as layers 410 and 420 shown in FIG. 4, may be formed of any appropriate material, such as a polymeric material, such as polyurethane; a viscoelastic material; a non-viscoelastic material; an elastomeric material; a gel; any material disclosed by any document incorporated herein by reference; or the like. The various layers may be bonded together by any suitable adhesive, may be coextruded, or may be fabricated and/or assembled using any process and/or equipment known in the art.

Figure 5:
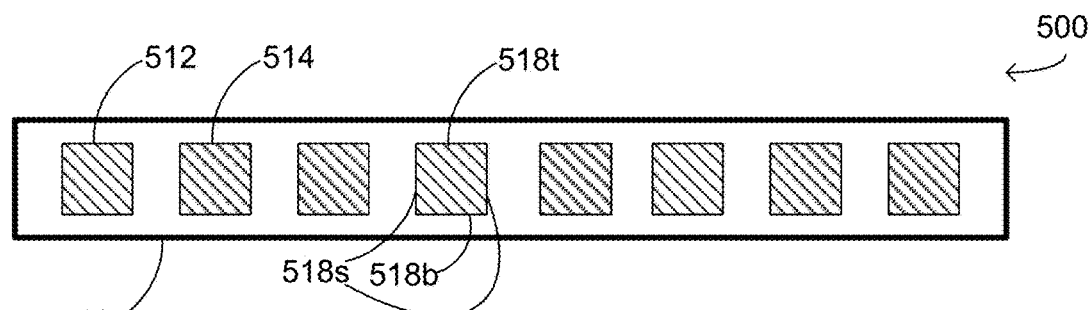
FIG. 5 illustrates a stylized cross-sectional view of a second mattress, in accordance with embodiments herein.

Turning to FIG. 5, a cross-sectional view of a first layer 520 of a body support structure 500 is shown, in accordance with embodiments herein. The body support structure 500 comprises a plurality of gel springs 512, 514, etc. Each gel spring has a top surface, e.g. 518t; a bottom surface, e.g., 518b, and a side wall, e.g., 518s. The gel springs 512-514 etc. depicted in FIG. 5 are cubes or rectangular prisms, but the gel springs of this embodiment may be any shape in three-dimensions or in cross-section, including, but not limited to, circles, ellipses, triangles, quadrilaterals, polygons having more than four sides, I-shaped, H-shaped, C-shaped, U-shaped, etc. More information regarding gel springs, including shapes, structures, components, and manufacturing techniques, can be found in patents incorporated herein by reference. In some embodiments, the gel springs 512-514 etc., may be encased into a polymetric material.

Figure 6:
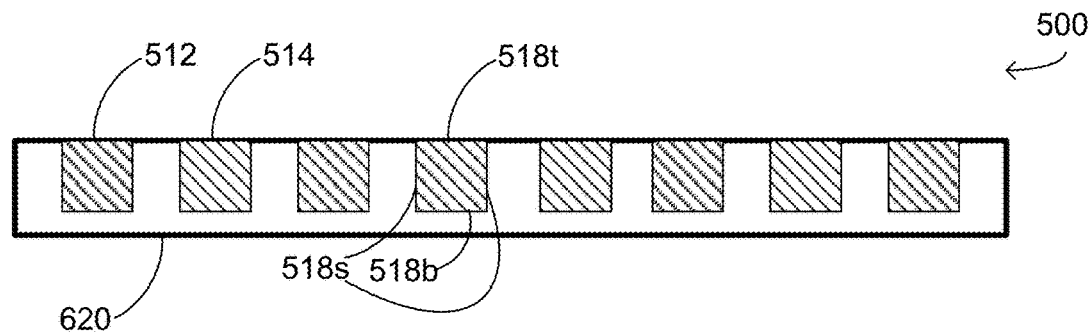
FIG. 6 illustrates a stylized cross-sectional view of another embodiment of the second mattress, in accordance with embodiments herein.
Figure 7:
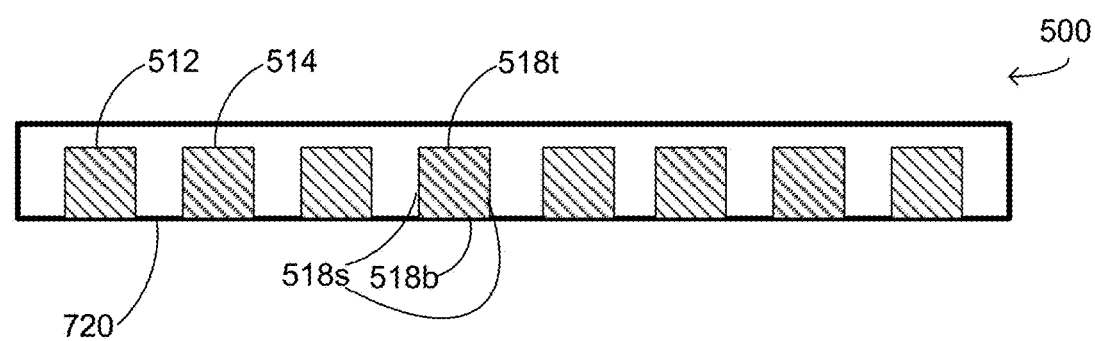
FIG. 7 illustrates a stylized cross-sectional view of an additional embodiment of the second mattress, in accordance with embodiments herein.

In the embodiment of FIG. 5, the first layer 520 is in contact with substantially the entire side wall of each gel spring 512-514 etc. In addition, the first layer 520 is in contact with substantially the entire top surface and substantially the entire bottom surface of each gel spring 512-514 etc. In other, related embodiments, a first layer 620 may be in contact only with the side walls and bottoms of gel springs 512-514 etc., as shown in FIG. 6; a first layer 720 may be in contact only with the side walls and tops of gel springs 512-514 etc., as shown in FIG. 7; or a first layer may be in contact only with the side walls of gel springs (now shown).

The first layer 520, 620, or 720 may be formed of any appropriate material, such as a polymeric material, such as polyurethane; a viscoelastic material; a non-viscoelastic material; an elastomeric material; a gel; any material disclosed by any document incorporated herein by reference; or the like. The first layer 520, 620, or 720 may be bonded to the gel springs 512-514 etc. by any suitable adhesive, may be coextruded, or may be fabricated and/or assembled using any process and/or equipment known in the art.

In embodiments, the body support structure 500 may further comprise one or more layers above the first layer 520, 620, or 720; one or more layers below the first layer 520, 620, or 720; or both.

Although known materials and structures may be used for gel springs 512-514 etc., in embodiments, at least one of the gel springs 512-514 etc. may have one or more of the following properties:

The gel spring(s) may comprise a material which transfers heat away from a surface of the body support structure 500 configured for contact with a user's body;

The gel spring(s) may have a coiled structure;

The gel spring(s) may have a structure comprising an inner gel and an outer skin, wherein the outer skin forms substantially the entire side wall of the gel spring;

The gel spring(s) may comprise openings or orifices for the escape of heat from the interior thereof.

Regarding gel spring(s) comprising a material which transfers heat away from a surface of the body support structure 500 configured for contact with a user's body, such materials are known, and the determination of an optimal material and concentration thereof to be included in the gel spring(s) is a matter of routine experimentation for the person of ordinary skill in the art having the benefit of the present disclosure.

Whether or not gel spring(s) comprise such a material, in one embodiment, not shown, the body support structure 500 may comprise at least one heat escape pathway from an interior of the body support structure 500 to a surface of the body support structure 500 other than a surface configured for contact with a user's body.

Alternatively or in addition, the gel spring(s) may comprise openings or orifices for the escape of heat from the interior thereof.

The use of gel spring(s) comprising a material which transfers heat away from a surface of the body support structure, gel spring(s) comprising openings or orifices for the escape of heat from the interior thereof, and/or at least one heat escape pathway from an interior of the body support structure to a surface of the body support structure other than a surface configured for contact with a user's body may improve user comfort by reducing the perception of a mattress comprising foam as "sleeping hot."

Figure 9A:
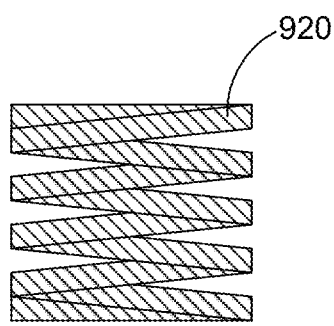
FIG. 9A illustrates a stylized side view of a coiled gel spring, in accordance with embodiments herein.
Figure 9B:
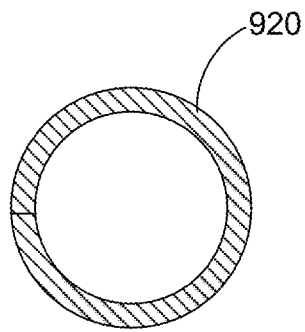
FIG. 9B illustrates a stylized top view of the coiled gel spring of FIG. 9A, in accordance with embodiments herein.

Turning to FIGS. 9A-9B, a gel spring 920 having a coiled structure is depicted in side elevation view (FIG. 9A) and top view (FIG. 9B). Though not to be bound by theory, the coiled structure of gel spring 920 may allow the gel spring 920 to respond to compressive force from a user's body in two ways, one by compression of the gel material, and the other by compression of the coiled structure, in the traditional manner of a metal or plastic spring.

Figure 10:
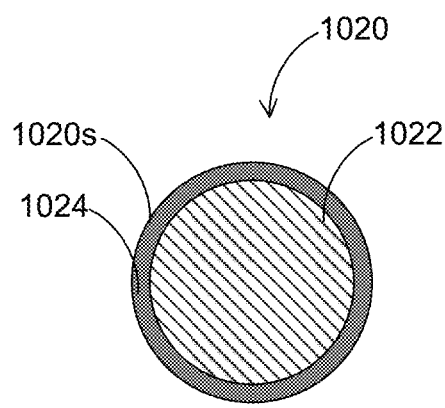
FIG. 10 illustrates a stylized top view of a gel spring, in accordance with embodiments herein.

Turning to FIG. 10, a gel spring 1020 having a structure comprising an inner gel 1022 and an outer skin 1024 is depicted in top view. The outer skin 1024 forms substantially the entire side wall 1020s of the gel spring 1020. The outer skin 1024 may be formed of any appropriate material, such as a polymeric material, such as polyurethane; a viscoelastic material; a non-viscoelastic material; an elastomeric material; a gel; any material disclosed by any document incorporated herein by reference; or the like.

Figure 8:
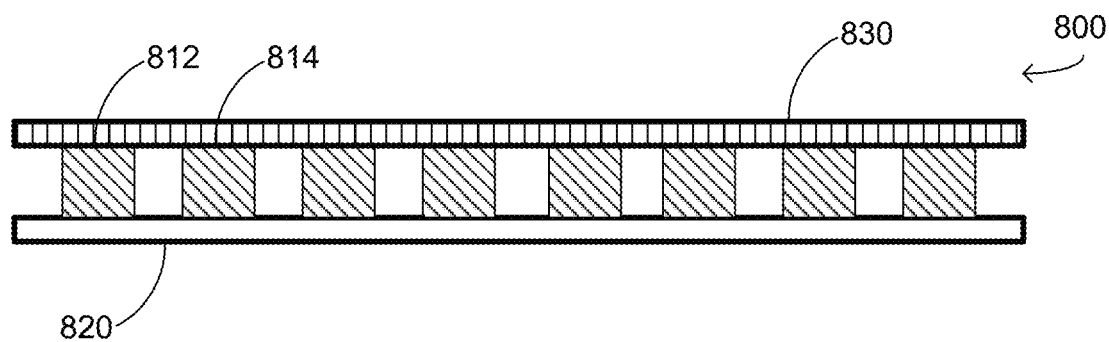
FIG. 8 illustrates a stylized cross-sectional view of a third mattress, in accordance with embodiments herein.

Turning to FIG. 8, any of the gel springs referred to above and/or depicted in FIGS. 9A, 9B, or 10 may be used in a body support structure 800, comprising a plurality of gel springs 812-814 etc., wherein each gel spring has a top surface, a bottom surface, and a side wall; a layer 820 in contact with substantially the entire bottom surface of each gel spring; and a layer 840 in contact with substantially the entire top surface of each gel spring.

Figure 11:
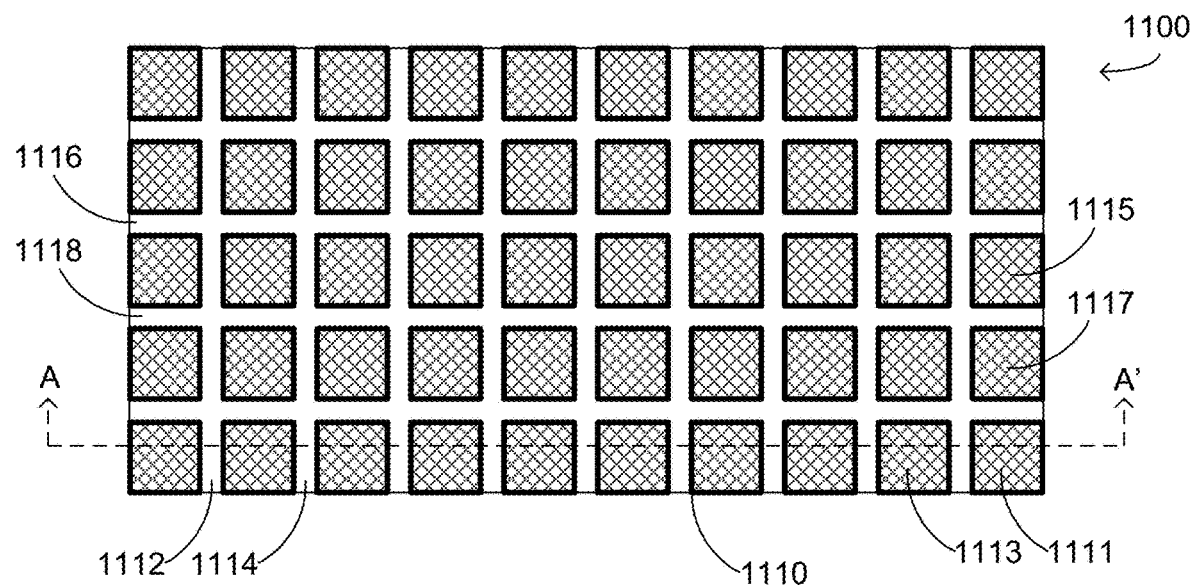
FIG. 11 illustrates a stylized top view of a fourth mattress, in accordance with embodiments herein.

FIG. 11 depicts a top view of a support layer 1110 of a body support structure 1100, in accordance with embodiments herein. Numerous features of the support layer 1110 are similar to those of the gel layer 110 of body support structure 100 described above. Such similar features will not be described in detail.

A noteworthy difference between the support layer 1110 of FIG. 11 and the gel layer 110 of FIG. 1 lies in substructures of the support layer 1110. Instead of ridges and valleys, the support layer 1110 comprises a plurality of grooves 1112, 1114, 1116, 1118, etc. at or below a first height and a plurality of plateaus 1111, 1113, 1115, 1117, etc. at or above a second height above the first height.

The support layer 1110 may be considered to resemble the sole of a sneaker or running shoe, though this resemblance must not be construed as limiting the gel layer 110.

Figure 12:
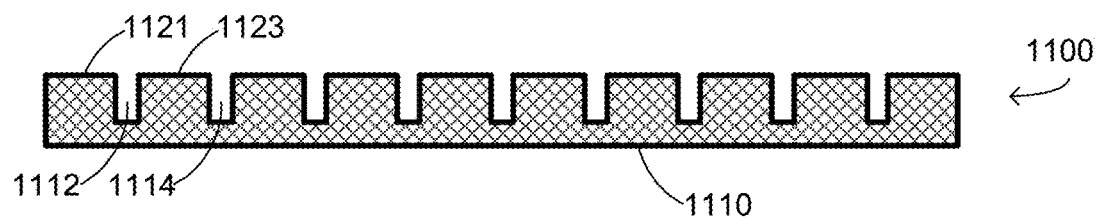
FIG. 12 illustrates a stylized cross-sectional view of the fourth mattress of FIG. 11 taken along the A-A' line in FIG. 11, in accordance with embodiments herein.
Figure 13:
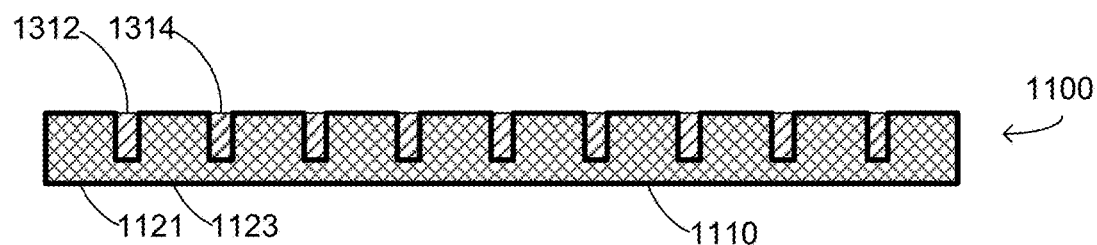
FIG. 13 illustrates a stylized cross-sectional view of the fourth mattress of FIG. 11 taken along the A-A' line in FIG. 11, in accordance with embodiments herein.

FIG. 12 shows grooves 1112, 1114, etc. and plateaus 1121, 1123, etc. in more detail. FIG. 13 shows that one or more of the grooves 1112, 1114, etc. may be filled to yield filled grooves 1312, 1314, etc.

Figure 14:
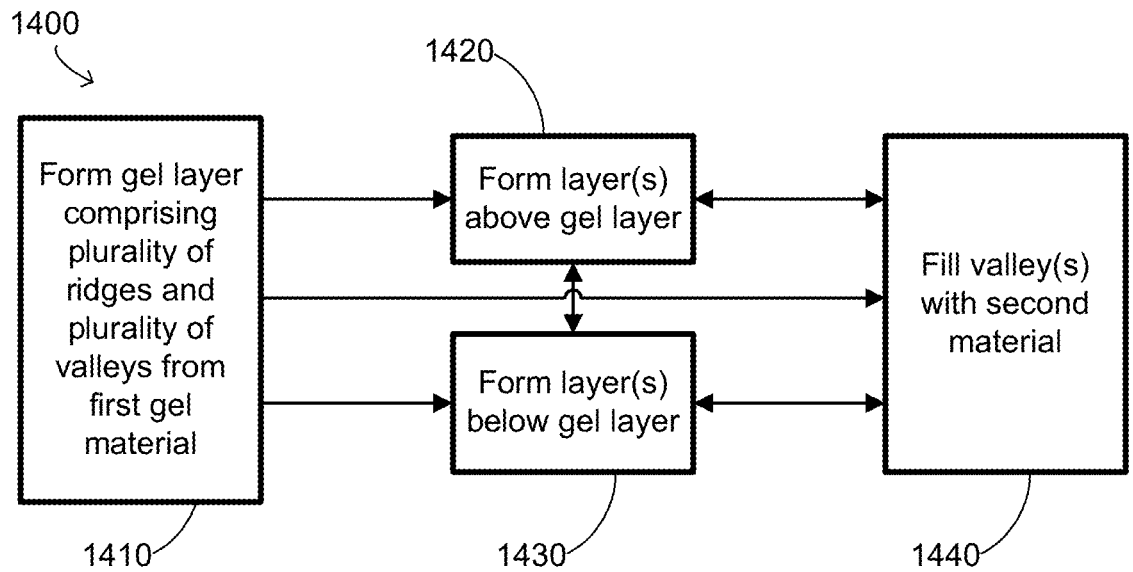
FIG. 14 provides a flowchart of a first method, in accordance with embodiments herein.

FIG. 14 presents a flowchart of a first method 1400 according to embodiments of the present disclosure. The first method 1400 comprises forming (at 1410) a support layer of a body support structure from a first material, wherein the support layer comprises a plurality of ridges at or above a first height and a plurality of valleys at or below a second height below the first height. In one embodiment, the support layer is formed (at 1410) such that each of the valleys has a shape selected from the group consisting of squares, rectangles, diamonds, parallelograms, other quadrilaterals, polygons with other than four sides, circles, ellipses, and other curved shapes.

The first method 1400 may further comprise forming (at 1420) at least one layer of the body support structure above the support layer; forming (at 1430) at least one layer of the body support structure below the support layer; and/or filling (at 1440) at least one of the valleys with a second material. In one embodiment, the filling (at 1440) fills all the valleys with the second material. If two or more of forming (at 1420), forming (at 1430), and filling (at 1440) are performed, the order in which they are performed may be selected as a routine matter by the person of ordinary skill in the art having the benefit of the present disclosure.

Particular techniques for forming (at 1420), filling (at 1440), and forming (at 1420 and/or 1430) will be known to the person of ordinary skill in the art having the benefit of the present disclosure, including the documents incorporated herein by reference. In one embodiment, forming (at 1420) may comprise injection molding.

Figure 15:
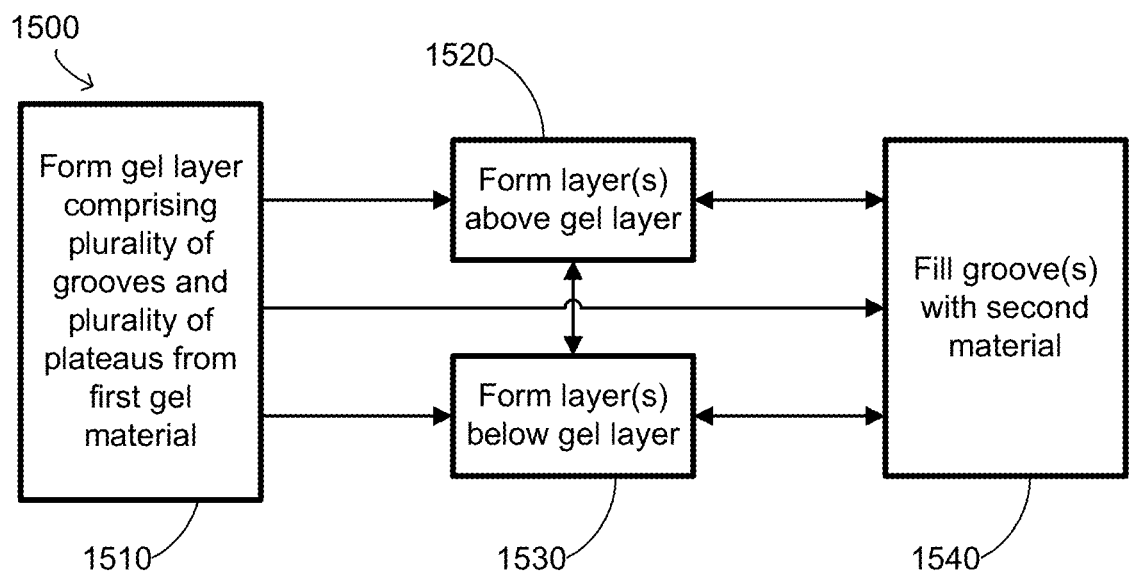
FIG. 15 provides a flowchart of a first method, in accordance with embodiments herein.

FIG. 15 presents a flowchart of a second method 1500 according to embodiments of the present disclosure. The second method 1500 comprises forming (at 1510) a support layer of a body support structure from a first material, wherein the support layer comprises a plurality of grooves at or below a first height and a plurality of plateaus at or above a second height above the first height. In one embodiment, the support layer is formed (at 1510) such that each of the plateaus has a shape selected from the group consisting of squares, rectangles, diamonds, parallelograms, other quadrilaterals, polygons with other than four sides, circles, ellipses, and other curved shapes.

The second method 1500 may further comprise forming (at 1520) at least one layer of the body support structure above the support layer; forming (at 1530) at least one layer of the body support structure below the support layer; and/or filling (at 1540) at least one of the grooves with a second material. In one embodiment, the filling (at 1540) fills all the grooves with the second material. If two or more of forming (at 1520), forming (at 1530), and filling (at 1540) are performed, the order in which they are performed may be selected as a routine matter by the person of ordinary skill in the art having the benefit of the present disclosure.

Particular techniques for forming (at 1520), filling (at 1540), and forming (at 1520 and/or 1530) will be known to the person of ordinary skill in the art having the benefit of the present disclosure, including the documents incorporated herein by reference. In one embodiment, forming (at 1520) may comprise injection molding.

FIGS. 16A-16D depict cross-sectional views of a layer 1620 of a body support structure 1600. The layer 1620 is in contact with the bottom surfaces of a plurality of gel springs 1612, 1614, etc. The layer 1620 of the various embodiments of FIGS. 16B-16D may have differing resistance to a compressive force 1630 impinging on the top surfaces of one or more of the gel springs 1612, 1614, etc. e.g., a compressive force resulting from a user's positioning on a top surface of the body support structure 1600.

Figure 16A:
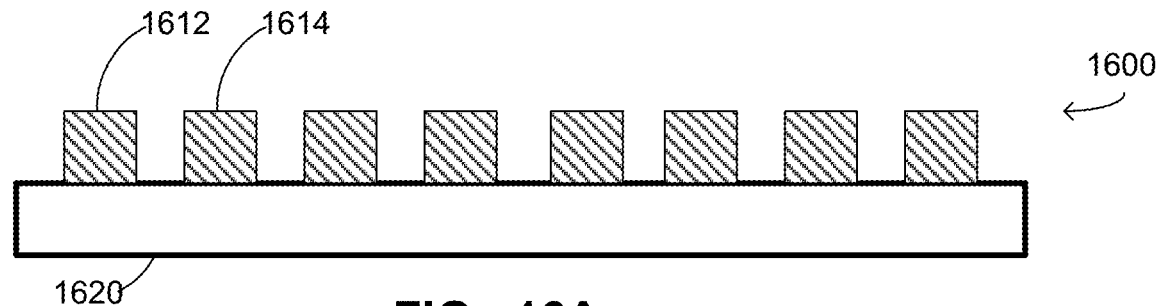
FIG. 16A illustrates a stylized side view of a fifth mattress, in accordance with embodiments herein.
Figure 16B:
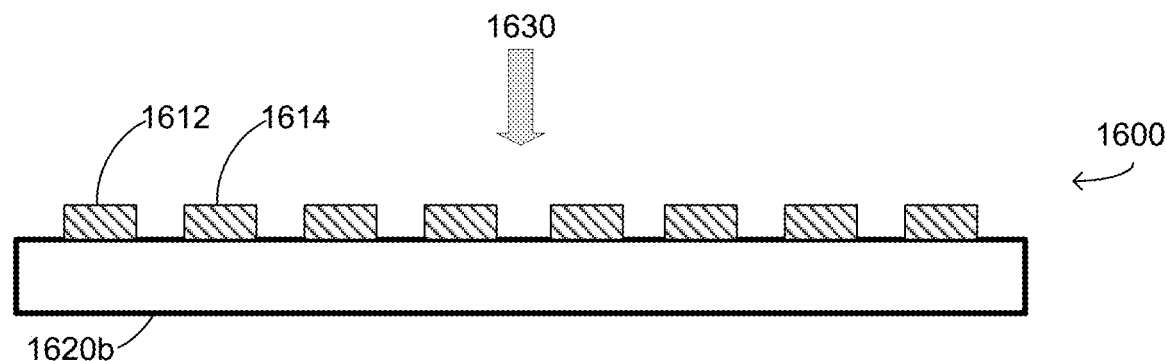
FIG. 16B illustrates a stylized side view of an embodiment of the fifth mattress after application of a compressive force, in accordance with embodiments herein.

Specifically, the layer 1620*b* depicted in FIG. 16B may have a high resistance to compression. Upon application of the compressive force 1630, the gel springs 1612-1614 etc. may be substantially compressed and the layer 1620*b* may be minimally compressed or substantially uncompressed.

Figure 16C:
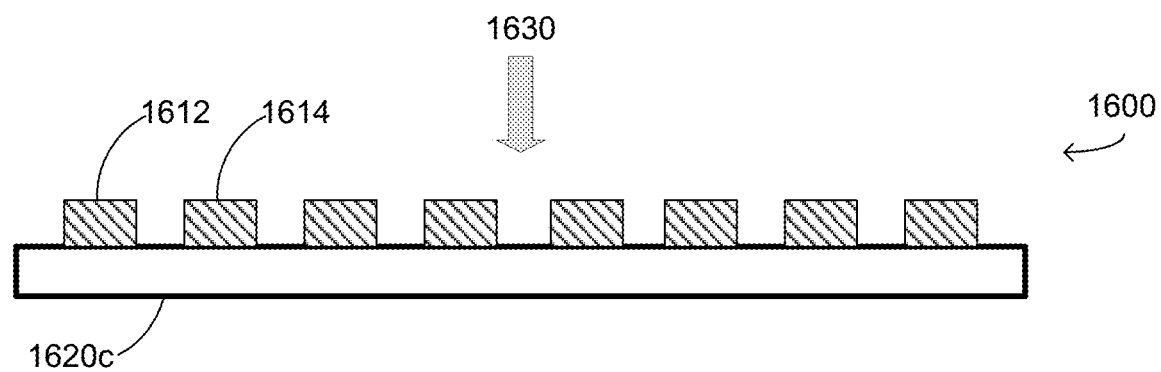
FIG. 16C illustrates a stylized side view of another embodiment of the fifth mattress after application of a compressive force, in accordance with embodiments herein.

In FIG. 16C, the layer 1620*c* may have a medium resistance to compression. Upon application of the compressive force 1630, the gel springs 1612-1614 etc. may be partially compressed and the layer 1620*c* may be partially compressed.

Figure 16D:
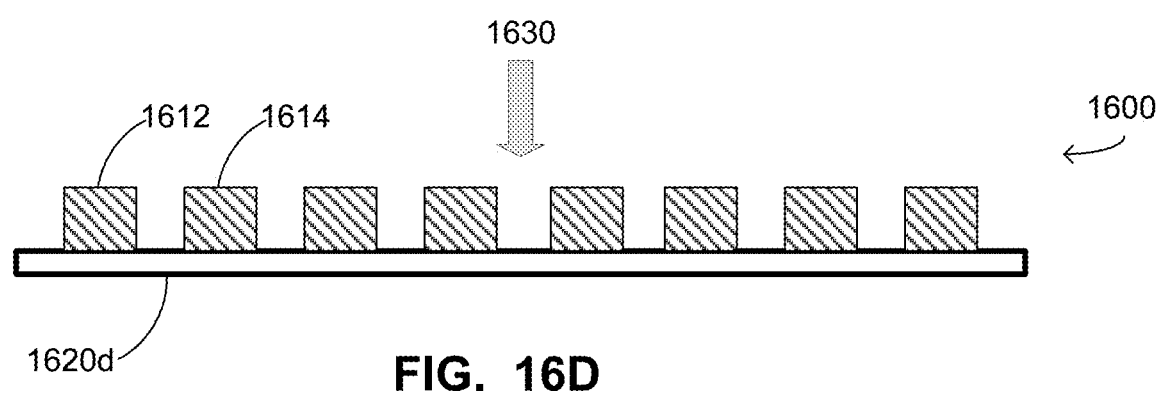
FIG. 16D illustrates a stylized side view of an additional embodiment of the fifth mattress after application of a compressive force, in accordance with embodiments herein.

In FIG. 16D, the layer 1620*d* may have a low resistance to compression. Upon application of the compressive force 1630, the gel springs 1612-1614 etc. may be minimally compressed or substantially uncompressed, and the layer 1620*d* may be substantially compressed.

In any of the depicted embodiments, the properties of the gel springs 1612-1614 etc. and the layer 1620 may be chosen to provide a particular desired firmness to the body support structure 1600 that may vary from time to time and place to place within the body support structure 1600 depending on the amount of the user's weight compressing any particular point at any particular time, and/or a change in the amount of the user's weight compressing any particular point at any particular time. A body support structure 1600 comprising such a layer 1620 and gel springs 1612-1614 etc. may be considered to possess "force balance," "reaction balance," "reaction force," "dynamic firmness," "dynamic balance," "dynamic reaction" technology or the like.

In one embodiment, the layer 1620 may not have a fixed force-response profile. In this embodiment, the layer 1620 may comprise one or more structures by which the firmness of the layer 1620 or a portion thereof may be adjusted by the user or automatically during use. E.g., the layer 1620 may comprise an air bladder or bladders, a liquid bladder or bladders, or a material that may change firmness upon a change in temperature or an application of an electric current, among others, or two or more thereof. The body support structure 1600 may comprise a controller (not shown) to receive input from a user or a sensor and effectuate a change in air volume, liquid volume, etc. in the layer 1620 to adjust the firmness of the layer 1620.

In any disclosed embodiment, the support layer and or first layer may, but need not, occupy the full top cross-sectional footprint of the body support structure. For example, in a particular embodiment relating to mattresses and mattress toppers, a support layer or first layer may be positioned under the expected location of a first user's head and torso and a second user's head and torso, and another sublayer, such as a sublayer consisting essentially of a viscoelastic foam, a non-viscoelastic foam, a polyurethane foam, etc. may fill in spaces between and around the support layer/first layer structures, e.g. under the expected position of the users' legs, in a median location between the users, and/or around the perimeter of the body support structure.

Figure 19:
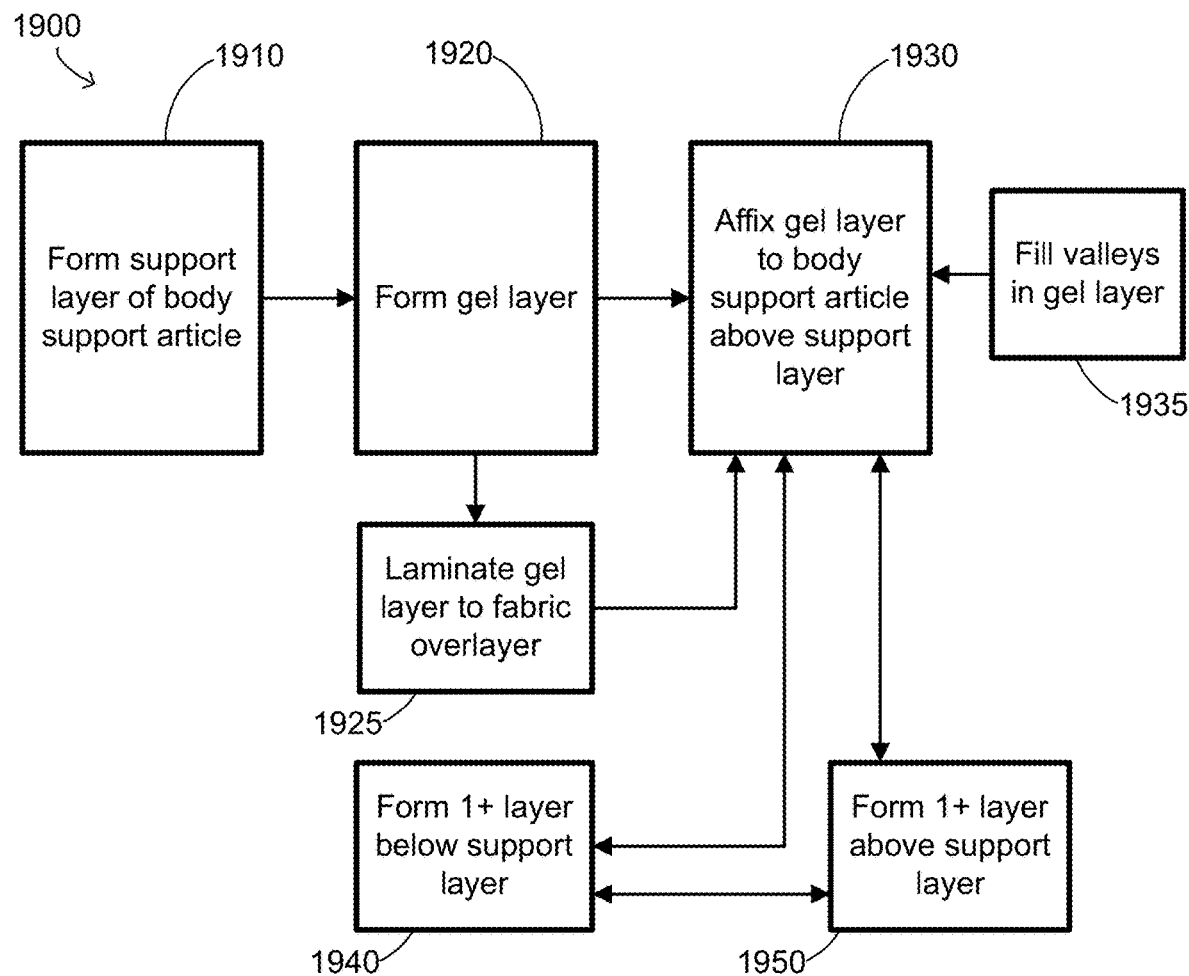
FIG. 19 provides a flowchart of a method, in accordance with embodiments herein.

Turning to FIG. 19, a flowchart of a method 1900 is shown. The method 1900 comprises forming (at 1910) a support layer of a body support article. In embodiments, the support layer may have a rectangular prism shape having a support layer width and a support layer length.

The body support article and the support layer may be as described above. Starting materials, techniques, and apparatus for forming (at 1910) the support layer may depend on the final materials of the formed support layer, other layers to be produced simultaneously with, before, and/or after forming (at 1910) the support layer, how other layers are to be combined into a final body support article, and considerations of cost and/or process efficiency, among other factors that will be apparent to the person of ordinary skill in the art having the benefit of the present disclosure.

The method 1900 also comprises forming (at 1920) a gel layer from a first gel material, wherein the gel layer comprises a plurality of ridges at or above a first height and a plurality of valleys at or below a second height below the first height.

Generally, the gel layer may be as described above. Starting materials, techniques, and apparatus for forming (at 1920) the gel layer may depend on the formulation of the formed gel layer, other layers to be produced simultaneously with, before, and/or after forming (at 1920) the gel layer and/or at later steps of the method 1900, how other layers are to be combined into a final body support article, and considerations of cost and/or process efficiency, among other factors that will be apparent to the person of ordinary skill in the art having the benefit of the present disclosure.

In one embodiment, the gel layer may be formed (at 1920) by injection molding, wherein a liquid formulation is introduced into a mold that is a three-dimensional negative of the gel layer, the liquid formulation gels to yield the gel layer inside the mold, and the mold is removed to yield the gel layer in a form usable for subsequent elements of the method 1900. Selection of process conditions, apparatus, and techniques for injection molding will be a routine matter for the person of ordinary skill in the art having the benefit of the present disclosure.

The method 1900 further comprises affixing (at 1930) the gel layer to the body support article above the support layer. Affixing (at 1930) may comprise any known techniques, such as gluing, bonding, laminating, co-extruding, stitching, etc.

In a particular embodiment, the method 1900 may further comprise laminating (at 1925) the gel layer to a fabric overlayer. The fabric overlayer may comprise any fabric known for use in upholstering mattresses or other body support articles, such as a cotton, a linen, a silk, a burlap, a canvas, a wool, a jute, a sisal, a synthetic fabric, etc. In one embodiment, the fabric overlayer comprises cotton with a thread count of 500 or more, such as 800 or more or 1000 or more. Laminating the gel layer to the fabric will involve the selection of optimum process conditions and other parameters that will be arrived at through routine experimentation by the person of ordinary skill in the art having the benefit of the present disclosure.

In embodiments wherein laminating (at 1925) is performed, the affixing (at 1930) may comprise stitching the fabric overlayer to the body support article. Stitching may be facilitated by the presence of a plurality of channels extending from the top to the bottom of the gel layer, such channels being coincident with first spaces 130 (in a gel layer such as gel layer 100) or being formed where first spaces 130 and second spaces 230 are vertically aligned (in a gel layer such as gel layer 200). Such channels are conceptually depicted in FIG. 1B, FIG. 2, and FIG. 4-FIG. 6, and are visible in images of physically extant gel layers, e.g., FIG. 9-FIG. 13. Stitching may yield an esthetically pleasing quilted aspect to the fabric overlayer and the gel layer, such as is shown in FIG. 22.

In another particular embodiment, the affixing (at 1930) may comprise direct gluing of the gel layer to the support layer.

The method 1900 may comprise numerous variations to form body support articles comprising a gel layer above a support layer having particular properties that may be desirable.

In one embodiment, the method 1900 may further comprise filling (at 1935) one, some, or all valleys in the gel layer with a second material. This may be performed before, after, or simultaneously with affixing (at 1930).

In one embodiment, forming (at 1910) the support layer may comprise forming the support layer to have a width essentially twice the width of an instance of the gel layer, forming (at 1920) may comprise forming two instances of the gel layer differing in one or more properties, such as gel segment thickness, gap/valley shape, gap/valley size, etc., and affixing (at 1930) may comprise positioning a first instance of the gel layer on and aligned with a left half of the support layer and positioning a second instance of the gel layer on and aligned with a right half of the support layer. In a particular further embodiment of forming (at 1920) two instances of the gel layer, the forming (at 1920) may impart to the first instance of the gel layer a firmness different from a firmness of the second instance of the gel layer.

Alternatively, or in addition, the method 1900 may further comprise forming (at 1940) at least one layer below the support layer. Alternatively, or in addition, the method 1900 may further comprise forming (at 1950) at least one layer between the support layer and the gel layer. The at least one layer below the support layer and the at least one layer between the support layer and the gel layer may be as described above. The person of ordinary skill in the art having the benefit of the present disclosure will readily be able to form such layers (at 1940 and/or 1950) using known apparatus, process conditions, and techniques).

Figure 20:
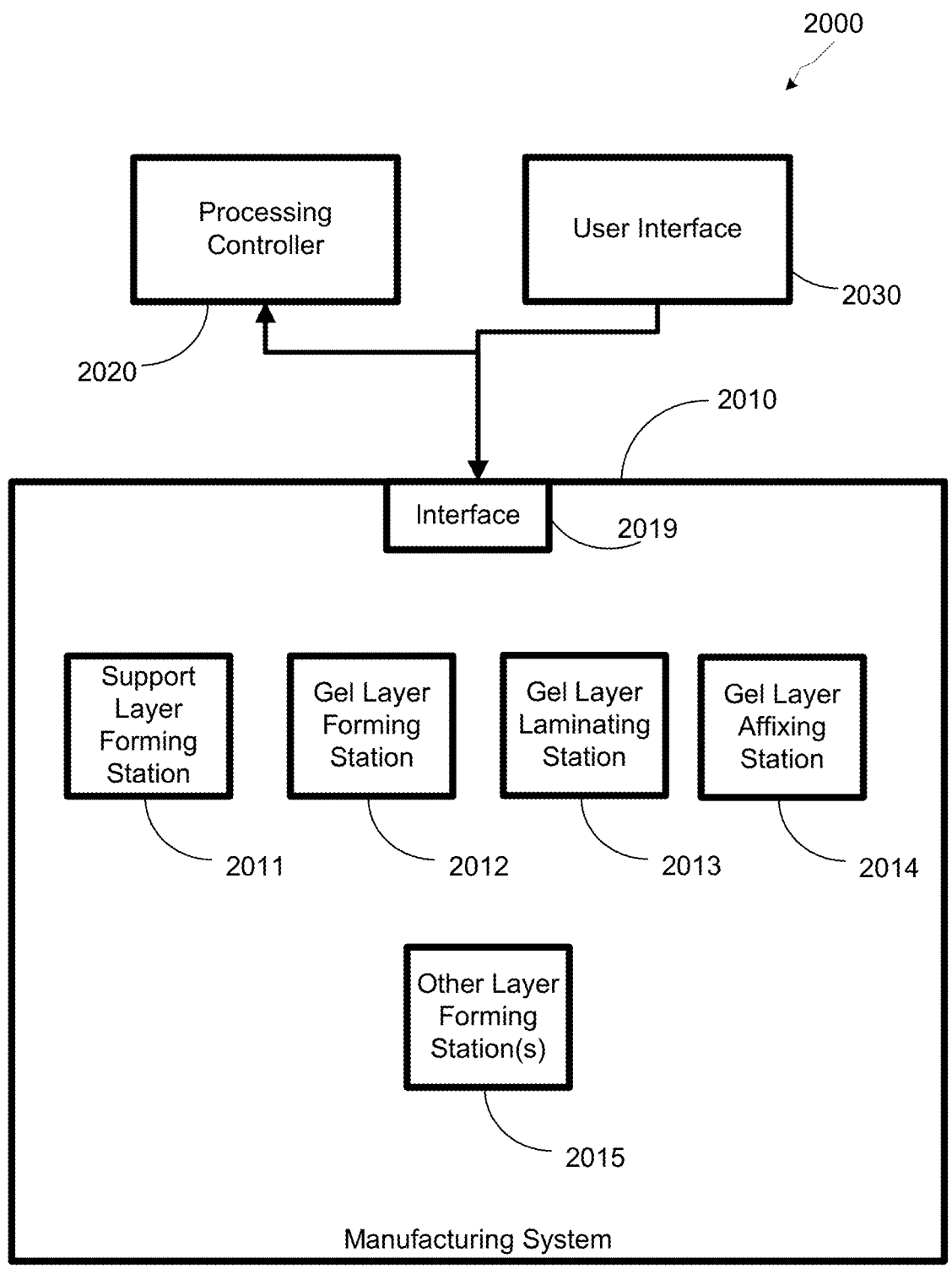
FIG. 20 conceptually depicts a manufacturing system, in accordance with embodiments herein.

We turn now to FIG. 20, which provides a stylized depiction of a system 2000 for fabricating a body support article in accordance with embodiments herein is illustrated. The system 2000 of FIG. 20 may comprise a manufacturing system 2010, a processing controller 2020, and a user interface 2030. The manufacturing system 2010 may manufacture body support articles based upon one or more designs generated and/or provided by processing controller 2020 and input received from the user interface 2030.

The manufacturing system 2010 may comprise various processing stations, such as support layer forming station 2011, gel layer forming station 2012, gel layer laminating station 2013, gel layer affixing station 2014, other layer forming station(s) 2015, material handling stations, final product handling stations, etc. Each of the processing stations may comprise one or more appropriate apparatus, input conveyances, output conveyances, utility subsystems (e.g., water, electricity, heat, steam, coolant, etc.), local controls, sensors or other process data gathering devices, communications with other processing stations, the processing controller 2020, the user interface 2030, etc. The operations to be performed at each station 2011-2015 may be those described above regarding corresponding operations performed in the method 1900.

The manufacturing system 2010 may also comprise an interface 2019 that is capable of providing communications between two or more of one, some, or all processing stations 2011-2015, the processing controller 2020, and the user interface 2030. One or more of the processing steps performed by the manufacturing system 2010 may be controlled by the processing controller 2020. The processing controller 2020 may be a workstation computer, a desktop computer, a laptop computer, a tablet computer, or any other type of computing device comprising one or more software products that are capable of controlling processes, which may comprise receiving process feedback, receiving test results data, performing learning cycle adjustments, performing process adjustments, etc.

The user interface 2030 may be configured to receive any desired input from one or more users. The user(s) may be manufacturing worker(s) and/or consumer(s). In one embodiment, the input is a first user preference between at least a first firmness and a second firmness. The user interface 2030 may be instantiated in hardware or software at a location remote from the manufacturing system 2010. For example, the user interface 2030 may be instantiated as an app on a computer or smartphone; a webpage accessible via a browser; a kiosk deployed at a point-of-sale location (e.g., a mattress retailer) and comprising a touchscreen and/or physical buttons for user input and a display, such as a graphical display, for presenting options and instructions to the user; etc.

In one embodiment, the user interface 2030 may be further configured to receive a second user preference between at least the first firmness and the second firmness. For the avoidance of doubt, the first user's preferred firmness could be the same as the second user's preferred firmness but need not be.

In a particular embodiment, the manufacturing system 2010 may be configured to form a support layer of a body support article, the support layer having a rectangular prism shape having a support layer width and a support layer length; and form a gel layer of a body support structure from a first gel material, wherein the gel layer comprises a plurality of ridges at or above a first height and a plurality of valleys at or below a second height below the first height.

In further embodiments, the manufacturing system 2010 may be configured to perform one or more of the following actions:

form at least one layer of the body support structure above the support layer;

form at least one layer of the body support structure below the support layer;

form the support layer from a viscoelastic foam, laminate the gel layer to a fabric overlayer, and stitch the fabric overlayer to the support layer; and/or fill at least one of the valleys with a second material.

Generally, any structures shown and described in one embodiment of the present disclosure may be incorporated into any other embodiment of the present disclosure, regardless of whether such structures are explicitly described as being components of that other embodiment.

A body support structure of any disclosed embodiment may be positioned on any appropriate foundation disposed thereunder. For example, if the body support structure is a mattress, the foundation may be selected from, but is not limited to, box springs; metal frames; and adjustable supports, including electromechanically adjustable supports; among others.

The particular embodiments disclosed above are illustrative only, as the disclosure may be modified and practiced in different, but equivalent manners, apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the disclosure. Accordingly, the protection sought herein is as set forth in the claims below.

What is claimed is:

1. A body support structure, comprising:
a gel layer formed of a first material and comprising a plurality of ridges at or above a first height and a plurality of valleys at or below a second height below the first height, each of the valleys having a convex pentagon shape that is neither equilateral or equiangular and wherein the valleys are grouped together into a rosette with rotational symmetry around a vertex.

2. The body support structure of claim 1, further comprising:
at least one layer above the gel layer.

3. The body support structure of claim 1, further comprising:
at least one layer below the gel layer.

4. The body support structure of claim 1, wherein the at least one layer below the gel layer is a viscoelastic foam layer directly below the gel layer.

5. The body support structure of claim 1, wherein at least one of the valleys is filled with a second material.

6. The body support structure of claim 5, wherein all the valleys are filled with the second material.

7. The body support structure of claim 1, wherein each of the valleys has a shape selected from the group consisting of squares, rectangles, diamonds, parallelograms, other quadrilaterals, polygons with other than four sides, circles, ellipses, and other curved shapes.

8. The body support structure of claim 1, wherein each of the valleys has an open floor.

9. A body support structure, as set forth in claim 1, wherein the valleys are capable of being grouped together into a rosette with 6-fold rotational symmetry around a vertex.

10. A method, comprising:
forming a gel layer of a body support structure from a first gel material, wherein the gel layer comprises a plurality of ridges at or above a first height and a plurality of valleys at or below a second height below the first height, each of the valleys having a convex pentagon shape that is neither equilateral or equiangular and wherein the valleys are grouped together into a rosette with rotational symmetry around a vertex.

11. The method of claim 10, further comprising:
forming at least one layer of the body support structure above the gel layer.

12. The method of claim 10, further comprising:
forming at least one layer of the body support structure below the gel layer.

13. The method of claim 12, wherein the at least one layer below the gel layer is a viscoelastic foam layer, and the method further comprises laminating the gel layer to a fabric overlayer; and stitching the fabric overlayer to the viscoelastic foam layer.

14. The method of claim 10, further comprising:
filling at least one of the valleys with a second material.

15. The method of claim 14, wherein the filling fills all the valleys with the second material.

16. The method of claim 10, wherein the gel layer is formed such that each of the valleys has a shape selected from the group consisting of squares, rectangles, diamonds, parallelograms, other quadrilaterals, polygons with other than four sides, circles, ellipses, and other curved shapes.

17. A method, as set forth in claim 10, further comprising grouping the valleys into a rosette with 6-fold rotational symmetry around a vertex.

18. A system, comprising:
a manufacturing system configured to:
form a support layer of a body support article, the support layer having a rectangular prism shape having a support layer width and a support layer length; and
form a gel layer of a body support structure from a first gel material, wherein the gel layer comprises a plurality of ridges at or above a first height and a plurality of valleys at or below a second height below the first height, each of the valleys having a convex pentagon shape that is neither equilateral or equiangular and wherein the valleys are grouped together into a rosette with rotational symmetry around a vertex.

19. The system of claim 18, wherein the manufacturing system is configured to form the gel layer such that each of the valleys has an open floor.

20. A system, as set forth in claim 18, wherein the valleys are capable of being grouped together into a rosette with 6-fold rotational symmetry around a vertex.

* * * * *